United States Patent
Cai et al.

(10) Patent No.: US 11,435,521 B2
(45) Date of Patent: Sep. 6, 2022

(54) OPTICAL FIBER ARRAY

(71) Applicant: WUHAN YILUT TECHNOLOGY CO., LTD., Hubei (CN)

(72) Inventors: Jingnong Cai, Hubei (CN); Zhiheng Zhang, Hubei (CN)

(73) Assignee: WUHAN YILUT TECHNOLOGY CO., LTD., Wuhan (CN)

( * ) Notice: Subject to any disclaimer, the term of this patent is extended or adjusted under 35 U.S.C. 154(b) by 112 days.

(21) Appl. No.: 16/968,353

(22) PCT Filed: Sep. 24, 2019

(86) PCT No.: PCT/CN2019/107492
§ 371 (c)(1),
(2) Date: Aug. 7, 2020

(87) PCT Pub. No.: WO2020/082962
PCT Pub. Date: Apr. 30, 2020

(65) Prior Publication Data
US 2021/0088721 A1    Mar. 25, 2021

(30) Foreign Application Priority Data
Oct. 23, 2018    (CN) .......................... 201811238274.9

(51) Int. Cl.
*G02B 6/08*    (2006.01)
(52) U.S. Cl.
CPC ..................... *G02B 6/08* (2013.01)
(58) Field of Classification Search
None
See application file for complete search history.

(56) References Cited

U.S. PATENT DOCUMENTS 4,978,193 A * 12/1990 Tomita ................. B24B 19/226
    385/55
2002/0190431 A1* 12/2002 Matsumoto ...... B29D 11/00663
    425/408

(Continued)

FOREIGN PATENT DOCUMENTS

| CN | 104796631 A | 7/2015 |
| CN | 206684343 U | 11/2017 |
| CN | 207380288 U | 5/2018 |

(Continued)

OTHER PUBLICATIONS

International Search Report dated Dec. 20, 2019 in connection with PCT International Application No. PCT/CN2019/107492.

*Primary Examiner* — Chad H Smith
(74) *Attorney, Agent, or Firm* — John P. White

(57) ABSTRACT

An optical fiber array, wherein a preset number of optical fibers (13) are fixed by a substrate (12) and a lid plate (11) each provided with V-grooves, and the distribution of fiber cores of the preset number of optical fibers (13) on a port cross-section of the optical fiber array matches a preset curve, such that light beams transmitted and output through the optical fiber array are not transmitted on the same plane, and correspond to required positions on the preset curve. Accordingly, the optical fiber array meets application requirements of a novel WSS system, and can be widely used in the novel WSS system and in other scenarios having special requirements of light beam positions.

19 Claims, 1 Drawing Sheet

(56) References Cited

U.S. PATENT DOCUMENTS

2009/0285533 A1* 11/2009 Hiroi .................. G02B 6/3664
385/65
2010/0111478 A1* 5/2010 Fujiyama ............. G02B 6/3636
264/1.25

FOREIGN PATENT DOCUMENTS

| CN | 109407206 A | 3/2019 |
| --- | --- | --- |
| CN | 209248072 U | 8/2019 |
| JP | 2015215517 A | 12/2015 |

\* cited by examiner

OPTICAL FIBER ARRAY

CROSS-REFERENCE TO RELATED APPLICATIONS

This application is a § 371 national stage of PCT International Application No. PCT/CN2019/107492, filed Sep. 24, 2019, claiming priority of Chinese Patent Application No. 2018112382749, filed Oct. 23, 2018, the contents of which is hereby incorporated by reference into the application.

FIELD OF TECHNOLOGY

The embodiments of the present disclosure relate to the technical field of optical fiber transmission, and in particular, to an optical fiber array.

BACKGROUND

At present, with the fast development of communication technology and the rapid growth of its practical applications, the research of high-capacity optical fiber communication systems has great application value. As the demand for long-distance information transmission becomes greater, optical fibers are used more and more widely, and the demand for the use of optical fiber array is also augmenting. In an optical fiber array, multiple optical fibers are mounted on a substrate by V-grooves and a lid plate is covered on the optical fibers for fixation.

Optical fiber arrays are widely used in optical devices. By using optical splitter chips and optical fiber arrays with different channels, corresponding optical splitters with different branching ratios such as 1:4, 1:8, 1:16 and 1:32 can be produced. For optical transmission network equipment, the use of dynamic reconfigurable optical add/drop multiplexer (ROADM) technology can flexibly expand network capacity and reduce operating costs. Currently, wavelength selective switch (WSS) is a technical option for RODAM technology implementation. For 1×N WSS, 1 means the public port (i.e., the COM port), and N means the branch port. When a group of wavelength division multiplexing (WDM) signals enter from the COM port, the group of WDM signals are split according to the optical wavelength, and then depending on system requirements, each wavelength is routed to one of the N branch ports via WSS. Conversely, WSS can also take the N branch ports as input and the common port as output for beam combination.

For the light beam transmission in traditional optical fiber arrays, light beams are transmitted on the same plane; whereas, in a novel WSS system, due to the use of special crystals, it is necessary to make the distribution of the input light beams on the cross section correspond to a certain curve form, namely, the input light beams are not transmitted on the same plane. The traditional optical fiber arrays, however, are not able to output light beams whose distribution on the cross section matches a certain curve form, and hence they cannot be used as the input of the WSS system.

Therefore, there is an urgent need to provide an optical fiber array capable of outputting light beams whose distribution matches a certain curve.

SUMMARY

In order to solve or at least partially solve the problems above, the embodiments of the present disclosure provide an optical fiber array.

The embodiments of the present disclosure provide an optical fiber array, comprising: a substrate, a lid plate and a preset number of optical fibers:

the substrate is provided with the preset number of first-type V-grooves, the lid plate is provided with second-type V-grooves matched with each first-type V-groove, and each optical fiber is fixed by a first-type V-groove and a matched second-type V-groove:

the distribution of cores of the preset number of optical fibers on a port cross-section of the optical fiber array matches a preset curve.

For an optical fiber array provided by the embodiments of the present disclosure, a preset number of optical fibers are fixed by a substrate and a lid plate each provided with V-grooves, and the distribution of fiber cores of the preset number of optical fibers on a port cross-section of the optical fiber array matches a preset curve, such that light beams transmitted and output through the optical fiber array are not transmitted on the same plane, and correspond to required positions on the preset curve. Accordingly, the optical fiber array meets application requirements of a novel WSS system, and can be widely used in the novel WSS system and in other scenarios having special requirements of light beam positions.

BRIEF DESCRIPTION OF THE DRAWINGS

In order to make the embodiments of the present disclosure or the technical solutions in the prior art clearer, drawings needed in the embodiments or the description of the prior art are briefly introduced as follows. Obviously, the drawings in the following description are only some of the embodiments of the present disclosure. For those of ordinary skill in the art, other drawings can be obtained based on these drawings without paying any creative effort.

DETAILED DESCRIPTION

Figure 1:
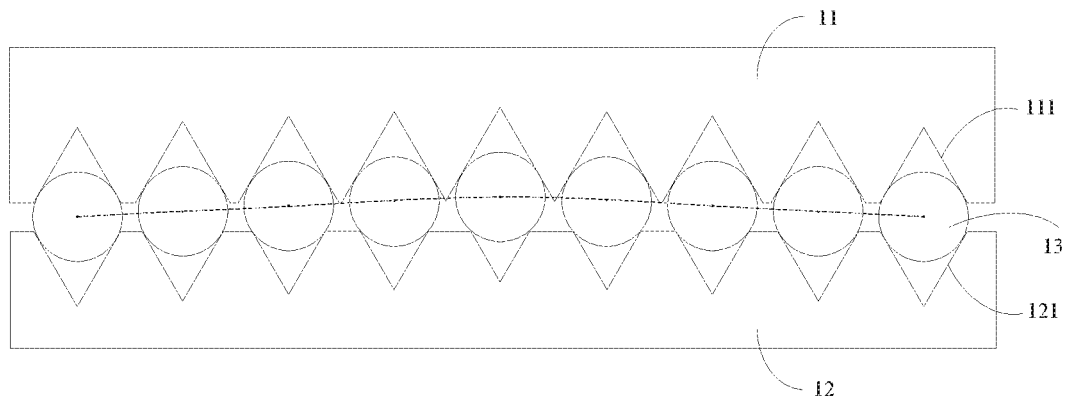
FIG. 1 is a schematic structural diagram of an optical fiber array provided by an embodiment of the present disclosure.

In order to make the objectives, technical solutions and advantages of the embodiments of the present disclosure clearer, the technical solutions in the embodiments of the present disclosure will be described clearly and completely below in conjunction with the accompanying drawings in the embodiments of the present disclosure. Obviously, the embodiments described are some of the embodiments of the present disclosure, rather than all of the embodiments. Based on the embodiments in the present disclosure, all other embodiments obtained by those of ordinary skill in the art without creative effort shall fall within the protection scope of the present disclosure.

With respect to the description of the present disclosure, it should be noted that the orientation or positional relationship indicated by the terms such as "center," "upper," "lower," "left," "right," "vertical," "horizontal," "inner," "outer", etc. is based on the orientation or positional relationship shown in the drawings, the purpose of which is only to facilitate the description of the present disclosure and simplify the description, rather than to indicate or imply that the referred device or element must have a particular orientation, be constructed and operated in a specific orientation, and therefore cannot be construed as a limitation of the embodiments of the present disclosure. In addition, the terms "first," "second" and "third" are used for descriptive purpose only, and cannot be understood as indicating or implying the relative importance.

In the description of the present disclosure, it should be noted that, unless otherwise clearly specified or defined, the terms "install", "connect with" and "connect to" should be understood in a broad sense, for example, it can be a fixed connection or a detachable connection, or an integral connection; it can be mechanically connected or electrically connected; it can be directly connected or indirectly connected through an intermediary, or connected within two components. For those of ordinary skill in the art, the specific meaning of the above terms in the present disclosure can be understood according to the specific situations Optical fiber arrays are commonly applied in optical devices, for example, in WSS systems, while novel WSS systems have certain requirements for incident position of the input beams since optical crystals are needed to process the input beams. However, the optical fiber arrays used at the input end of the WSS system in the prior art can only transmit light beams on the same plane, which cannot meet the requirements of the novel WSS systems. Therefore, in the embodiments of the present disclosure, provided is a novel optical fiber array, which allows the transmitted light beams to have a specific position distribution, thereby meeting the requirements of the incident position in the WSS system. It should be noted that, according to the principle of reversibility of the optical path, the optical fiber array provided in the embodiments of the present disclosure can also be used in the output position of the WSS system. In addition, in the embodiments of the present disclosure, only the WSS system is taken as an example to illustrate the application scenarios of the optical fiber array provided in the embodiments of the present disclosure, while the optical fiber array provided in the embodiments of the present disclosure can be applied to other scenarios that have special requirements for the position of the incident or exiting light beams.

As shown in FIG. 1, an embodiment of the present disclosure provides an optical fiber array, comprising a substrate 12, a lid plate 11, and a preset number of optical fibers 13.

The substrate 12 is provided with the preset number of first-type V-grooves 121, the lid plate 11 is provided with second-type V-grooves 111 matching each first-type V-groove 121, and each optical fiber 13 is fixed by a first-type V-groove 121 and a matched second-type V-groove 111;

the distribution of cores of the preset number of optical fibers 13 on a port cross-section of the optical fiber array matches a preset curve.

Specifically, FIG. 1 illustrates an example of an optical fiber array containing nine optical fibers, that is, the preset number is 9, but the embodiments of the present disclosure are not limited to that. Nine first-type V-grooves 121 are provided on the substrate 12, and nine second-type V-grooves 11 are provided on the lid plate 11. The first-type V-groove 121 corresponds to and matches the second-type of V-groove 111 one-to-one, and each of the first-type V-grooves 121 and the matched second-type V-grooves 111 are configured to fix one optical fiber. It should be noted that each of the first-type V-grooves and the matched second-type V-grooves are disposed in contact with the optical fiber inside, and gaps between the first-type V-grooves, the matched second-type V-grooves and the optical fiber inside are filled with UV Curing adhesive. The first-type V-grooves and the second-type V-grooves can be respectively provided on the substrate 12 and the lid plate 11 by etching.

The distribution of cores of the preset number of optical fibers 13 on the port cross-section of the optical fiber array matches a preset curve, as shown by the dashed line in FIG. 1, the cores of the nine optical fibers are all on the preset curve. It should be noted that the specific form of the preset curve can be set as required, specifically, it can be a Gaussian function curve, or a curve satisfying other function forms, which is not particularly defined in the embodiments of the present disclosure.

For the optical fiber array provided by the embodiments of the present disclosure, a preset number of optical fibers are fixed by a substrate and a lid plate each provided with V-grooves, and the distribution of the cores of the preset number of optical fibers on the port cross-section of the optical fiber array matches a preset curve, such that light beams transmitted and output through the optical fiber array are not transmitted on the same plane, and correspond to required positions on the preset curve. Accordingly, the optical fiber array meets application requirements of a novel WSS system, and can be widely used in the novel WSS system and in other scenarios having special requirements of light beam positions.

On the basis of the foregoing embodiments, an optical fiber array is further provided in an embodiment of the present disclosure, where the preset curve is specifically a Gaussian function curve. Where, the formula form of the Gaussian function is as follows:

$$f(x) = ae^{-(x-b)^2/2c^2}$$

Where, a, b, and c are all constants, and a>0, c≠0.

On the basis of the foregoing embodiments, an optical fiber array is further provided in an embodiment of the present disclosure, where the positions and depths of each first-type V-groove and the matched second-type V-groove are determined by the preset curve.

Specifically, in order to make the distribution of the cores of the preset number of optical fibers on the port cross-section of the optical fiber array match the preset curve, it is necessary to determine the positions and depths of the first-type V-groove and the matched second-type V-groove according to the form of the preset curve. During this process, it is necessary to ensure that the fibers inside the first-type V-grooves and the matched second-type V-grooves contact both walls of the first-type V-grooves and walls of the matched second-type V-grooves, so as to ensure that the optical fibers can be firmly fixed within the first-type V-grooves and the matched second-type V-grooves.

On the basis of the foregoing embodiments, an optical fiber array is further provided in an embodiment of the present disclosure, where the pitch between every two adjacent optical fibers in the preset number of optical fibers is a preset distance.

Specifically, in an embodiment of the present disclosure, in order to ensure the standardization of the optical fiber array and the uniform distribution of the transmitted and output light beams, a pitch between every two adjacent optical fibers is the same, being preset distance. Where, the pitch between every two adjacent optical fibers means a distance between the cores of the two optical fibers. The preset distance can be set as required, for example, the preset distance can be set to be greater than or equal to 125 µm. If the preset distance is set to be 125 µm, the pitch between every two adjacent optical fibers is 125 μm, and every two adjacent fibers contact; if the preset distance is set to be greater than 125 μm, there is a gap between the surfaces of every two adjacent optical fibers.

It should be noted that, in order to ensure that the optical fiber array provided in the embodiments of the present disclosure has a wide range of use, the pitch between every two adjacent optical fibers in the preset number of optical fibers may be set to be partially the same or different as required, which is not specifically defined in the embodiments of the present disclosure.

On the basis of the foregoing embodiments, an optical fiber array is further provided in an embodiment of the present disclosure, where opening angles of each first-type V-groove and each second-type V-groove are the same.

Specifically, in an embodiment of the present disclosure, the opening angles of both the first-type V-groove on the substrate and the second-type V-groove on the lid plate of the optical fiber array can be set as required, and the opening angle of each V-groove may be the same or different, as long as the distribution of the fiber cores of the internally fixed optical fibers on the port cross-section of the optical fiber array matches the preset curve. As a preferred solution, the opening angle of each V-groove can be set to be the same to ensure not only a convenient and quick etching, but also an easy implementation.

On the basis of the foregoing embodiments, an optical fiber array is further provided in an embodiment of the present disclosure, where an optical fiber span inside each first-type V-groove and the matched second-type V-groove is an optical fiber span with a coating layer being removed. When a light beam is transmitted by the optical fiber array, there is a portion of the beam that leaks from the core into the cladding of the fiber in addition to the residual beam in the cladding. If the light beam in the cladding is not stripped but is directly output, the quality of the output light beam will be affected. Therefore, as a preferred solution, the optical fiber span inside each first-type V-groove and the matched second-type V-groove may be an optical fiber span of which the coating layer and fiber cladding have been stripped, so as to prevent the occurrence of the above phenomenon.

On the basis of the foregoing embodiments, an optical fiber array is further provided in an embodiment of the present disclosure, where a preset bevel angle is formed between a fiber end face at a coupled end of the optical fiber array and a fiber axis.

Figure 2:
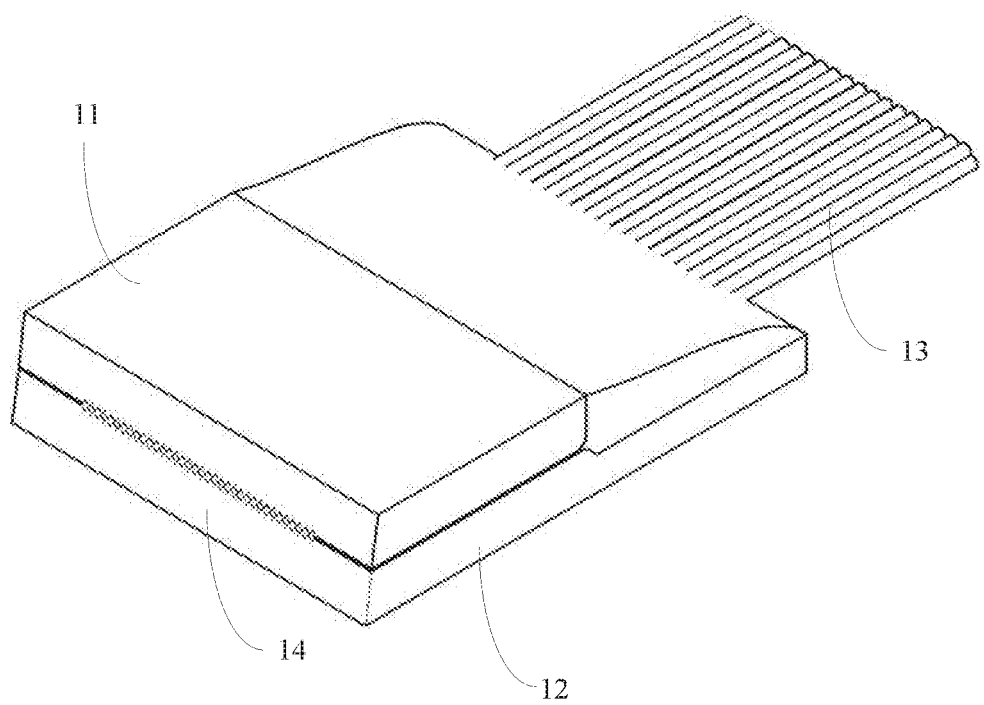
FIG. 2 is a schematic diagram of a complete structure of an optical fiber array provided by an embodiment of the present disclosure.

Specifically, as shown in FIG. 2, in order to ensure better use of the optical fiber array, better coupling when used in conjunction with other optical devices to prevent return loss, a preset bevel angle is formed between a fiber end face 14 at a coupled end of the fiber array and a fiber axis, namely, the preset bevel angle is formed between the end face of each fiber at the coupled end of the fiber array and the fiber axis. As a preferred solution, the value of the preset bevel angle may specifically be 81.5°-82.5°.

On the basis of the foregoing embodiments, an optical fiber array is further provided in an embodiment of the present disclosure, where both the substrate and the lid plate are made of high borosilicate glass material.

Specifically, in an embodiment of the present disclosure, high borosilicate glass materials are adopted to produce the substrate and the lid plate, such that the obtained optical fiber array has low expansion rate, high temperature resistance, high strength, high hardness, high light transmittance and high chemical stability.

The device embodiments described above are only schematic, wherein the units described as separate components may or may not be physically separated, and the components displayed as units may or may not be physical units, namely, they may be located in one place or, may be distributed to multiple network units. Part or all of the modules may be selected according to actual needs to achieve the purpose of the solutions of the embodiments. It can be understood and implemented by a person of ordinary skill in the art without paying creative labor.

Through the description of the above embodiments, it can be clearly understood by those skilled in the art that each embodiment can be implemented by means of software plus a necessary general hardware platform, and of course, it can also be implemented by hardware. Based on this understanding, the technical solutions above can be embodied in the form of software products, and the computer software products can be stored in computer readable storage media, such as ROM/RAM, magnetic disc, compact disc and the like. The software product includes several instructions to enable a computer device (may be a personal computer, server, or network device, etc.) to execute the methods of various embodiments or some parts of the embodiments.

Finally, it should be noted that the embodiments above are only for illustrating the technical solutions of the present disclosure, rather than limiting them; although the present disclosure has been described in detail with reference to the foregoing embodiments, those skilled in the art should understand that the technical solutions documented in the preceding embodiments can still be modified, or parts of the technical features thereof can be equivalently substituted; and such modifications or substitutions do not make the corresponding technical solutions deviate from the scope of the various technical solutions of the embodiments of the present disclosure.

The invention claimed is:

1. An optical fiber array, comprising a substrate, a lid plate, and a preset number of optical fibers;
   the substrate is provided with a preset number of first-type V-grooves, the lid plate is provided with a second-type V-grooves matched with each first-type V-groove, and each optical fiber is respectively fixed by a first-type V-groove and a matched second-type V-groove; and
   a distribution of cores of the preset number of optical fibers on a port cross-section of the optical fiber array matches a preset curve, and the preset curve is specifically a Gaussian function curve.

2. The optical fiber array of claim 1, wherein the positions and depths of each first-type V-groove and the matched second-type V-groove are determined by the preset curve.

3. The optical fiber array of claim 1, wherein a pitch between every two adjacent optical fibers in the preset number of optical fibers is a preset distance.

4. The optical fiber array of claim 3, wherein the preset distance is greater than or equal to 125 μm.

5. The optical fiber array of claim 1, wherein opening angles of each first-type V-groove and each second-type V-groove are the same.

6. The optical fiber array of claim 1, wherein an optical fiber span inside each first-type V-groove and the matched second-type V-groove is an optical fiber span with a coating layer being removed.

7. The optical fiber array of claim 1, wherein a preset bevel angle is formed between a fiber end face at a coupled end of the fiber array and a fiber axis.

8. The optical fiber array of claim 7, wherein the preset bevel angle has a value of 81.5°-82.5°.

9. The optical fiber array of claim 1, wherein both the substrate and the lid plate are made of high borosilicate glass material.

10. The optical fiber array of claim 1, wherein opening angles of each first-type V-groove and each second-type V-groove are the same.

11. The optical fiber array of claim 2, wherein opening angles of each first-type V-groove and each second-type V-groove are the same.

12. The optical fiber array of claim 3, wherein opening angles of each first-type V-groove and each second-type V-groove are the same.

13. The optical fiber array of claim 4, wherein opening angles of each first-type V-groove and each second-type V-groove are the same.

14. The optical fiber array of claim 1, wherein an optical fiber span inside each first-type V-groove and the matched second-type V-groove is an optical fiber span with a coating layer being removed.

15. The optical fiber array of claim 2, wherein an optical fiber span inside each first-type V-groove and the matched second-type V-groove is an optical fiber span with a coating layer being removed.

16. The optical fiber array of claim 3, wherein an optical fiber span inside each first-type V-groove and the matched second-type V-groove is an optical fiber span with a coating layer being removed.

17. The optical fiber array of claim 1, wherein a preset bevel angle is formed between a fiber end face at a coupled end of the fiber array and a fiber axis.

18. The optical fiber array of claim 2, wherein a preset bevel angle is formed between a fiber end face at a coupled end of the fiber array and a fiber axis.

19. The optical fiber array of claim 3, wherein a preset bevel angle is formed between a fiber end face at a coupled end of the fiber array and a fiber axis.

* * * * *